US008549548B2

(12) United States Patent
Liu et al.

(10) Patent No.: US 8,549,548 B2
(45) Date of Patent: Oct. 1, 2013

(54) DISC TRAY FOR PRINTING DEVICE

(75) Inventors: Ming-Hsun Liu, Taipei (TW);
Chung-Hsuan Tsai, Taipei (TW);
Chih-Sheng Liu, Taipei (TW)

(73) Assignee: Datatronics Technology, Inc., Taipei (TW)

(*) Notice: Subject to any disclaimer, the term of this patent is extended or adjusted under 35 U.S.C. 154(b) by 982 days.

(21) Appl. No.: 12/623,518

(22) Filed: Nov. 23, 2009

(65) Prior Publication Data
US 2011/0122454 A1 May 26, 2011

(51) Int. Cl.
*G11B 17/04* (2006.01)
(52) U.S. Cl.
USPC .......................................... 720/613
(58) Field of Classification Search
USPC .......................................... 720/613
See application file for complete search history.

(56) References Cited

U.S. PATENT DOCUMENTS

| 7,092,320 | B1 * | 8/2006 | Lee et al. | 369/30.32 |
| 7,127,725 | B2 * | 10/2006 | Lee | 720/600 |
| RE40,598 | E * | 12/2008 | Russ | 720/619 |
| 7,540,237 | B2 * | 6/2009 | Kubin et al. | 101/44 |
| 7,870,570 | B2 * | 1/2011 | Russ | 720/619 |
| 8,069,453 | B2 * | 11/2011 | Miyazaki | 720/612 |
| 8,355,301 | B2 * | 1/2013 | Ebina et al. | 369/30.57 |
| 2006/0179445 | A1 * | 8/2006 | Russ | 720/619 |
| 2008/0120630 | A1 * | 5/2008 | Lamberth | 720/623 |
| 2008/0244627 | A1 * | 10/2008 | Kubin et al. | 720/601 |
| 2009/0193446 | A1 * | 7/2009 | Temush et al. | 720/601 |

FOREIGN PATENT DOCUMENTS

| TW | M352745 | 3/2009 |
| TW | M357372 | 5/2009 |

* cited by examiner

*Primary Examiner* — Mark Blouin
(74) *Attorney, Agent, or Firm* — Alan Kamrath; Kamrath IP Lawfirm, P.A.

(57) ABSTRACT

A disc tray for a printing device includes a driving mover including a first guiding portion; a main body including a disc receiver having a holding portion and a sloping portion connected with each other, a second guiding portion engaged with the first guiding portion, and a third guiding portion, with the driving mover driving the main body by way of the first guiding portion and the second guiding portion to move the main body; and a supporter including a fourth guiding portion engaged with the third guiding portion to allow the fourth guiding portion to move along the third guiding portion. The supporter and the holding portion are used to support a printed disc. When the disc receiver receives the printed disc, the supporter is moved to be veiled under the main body for dropping the printed disc from the sloping portion of the disc receiver.

15 Claims, 9 Drawing Sheets

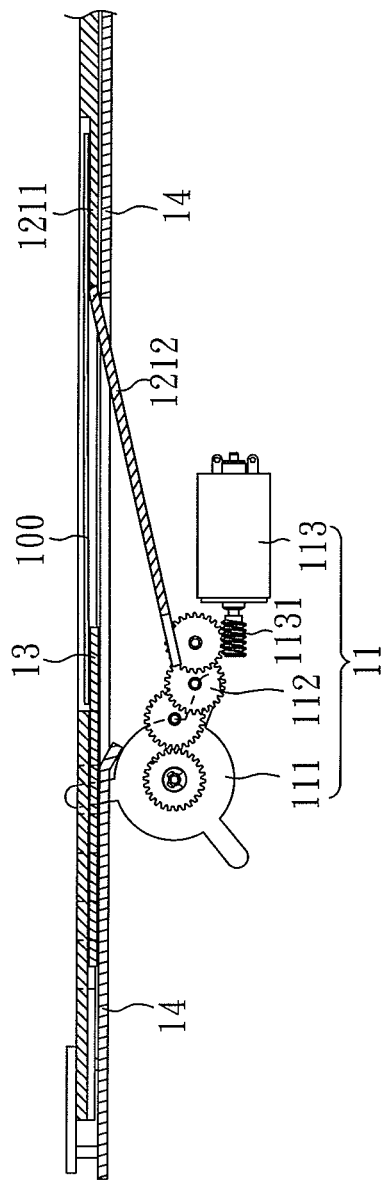
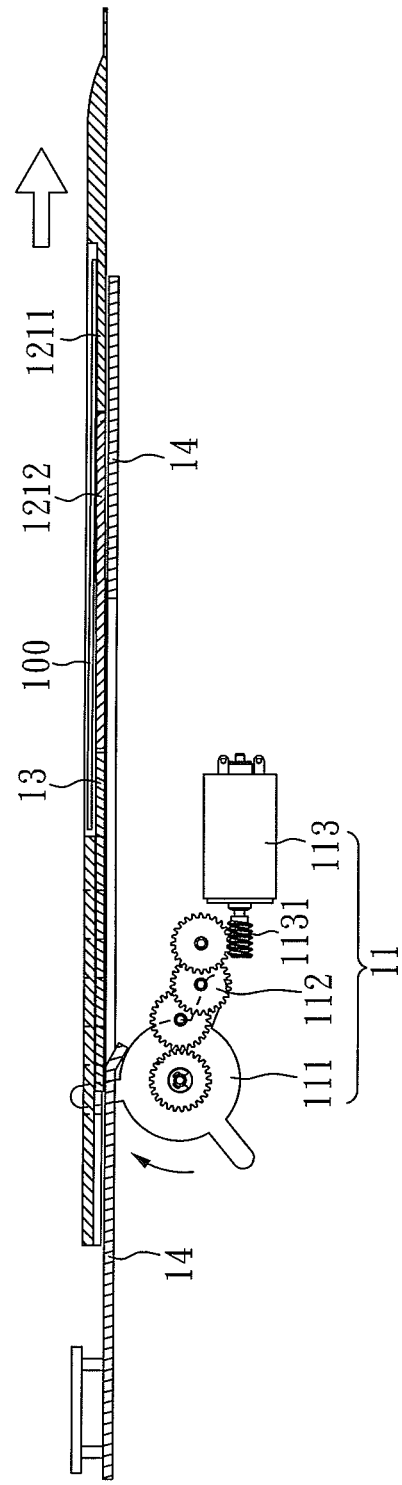
FIG. 3A
FIG. 3B

DISC TRAY FOR PRINTING DEVICE

BACKGROUND OF THE INVENTION

1. Field of the Invention

The present invention relates to a disc tray, and particularly, to a disc tray adapted for printing devices.

2. Description of the Related Art

The disc tray for printing devices has been developed for a long time. However, it still needs labor to manually change the disc before and after printing, respectively. Thus, it may drag down the efficiency for printing the discs.

When the transport arm device for carrying the disc was developed, it did help the printing efficiency for discs. However, before the discs are printed, they need to be processed, such as recording or verifying compact discs. In other words, the transport arm device needs to move the discs between two different processing systems. However the disc trays for different systems (such as a printing device system and a processing device system) usually have different designs. Furthermore, it will slow down the efficiency when waiting for the transport arm device to move away the discs from the printing device to a collecting tray and also when waiting for the transport arm device to move a next processed disc from the processing system to the printing device.

In addition, most printing devices multifunction. In other words, the modern printing devices can be used as a general printer to print papers and also can be used as a disc printer for printing the discs. However, due to the different size of the objects to be printed, it is required to manually set the printing device (printer) in order to comply with the different objects (i.e. papers and discs) to be printed.

SUMMARY OF THE INVENTION

A main objective of the present invention is to provide a disc tray for a printing device, which can receive a disc (such as CD or DVD, or the like) for the printing device to print on the disc.

Another objective of the present invention is to provide a control box adapted to a disc tray for controlling a sensor of a printing device, with the disc tray used for the printing device to print on a disc received on the disc tray.

The present invention provides a disc tray for a printing device comprising a mover driving means including a first guiding portion; a main body comprising a disc receiver having a holding portion and a sloping portion connected with each other, a second guiding portion engaged with the first guiding portion, and a third guiding portion, with the mover driving means driving the main body by way of the first guiding portion and the second guiding portion to move the main body; and a supporter comprising a fourth guiding portion engaged with the third guiding portion to allow the fourth guiding portion moving along the third guiding portion. The supporter and the holding portion are used to support a printed disc. When the disc receiver receives the printed disc, the supporter is moved to be veiled under the main body for dropping the printed disc from the sloping portion of the disc receiver.

In another aspect of the invention, a control box is provided. The control box of the present invention is adapted to a disc tray (such as the disc tray described above) for controlling a sensor of a printing device. The control box comprises a printer driving means; a hollowed shaft with an indentation; a movable portion comprising a main portion and a protrusion extending from the main portion, with the protrusion being received inside the indentation, and with the main portion comprising a hole; and an eccentric cam driven by the printer driving means. The hole of the main portion is used for receiving the eccentric cam. Thus, the printer driving means drives the eccentric cam for swaying the main portion and the protrusion to unveil the protrusion from the hollowed shaft for controlling the sensor of the printing device.

Other objectives, advantages, and novel features of the invention will become more apparent from the following detailed description when taken in conjunction with the accompanying drawings.

BRIEF DESCRIPTION OF THE DRAWINGS

FIG. 3A shows a partial cross-section view according to the 3A-3A line in FIG. 2A.

FIG. 3B shows a partial cross-section view according to the 3B-3B line in FIG. 2B.

DETAILED DESCRIPTION OF THE PREFERRED EMBODIMENT

Figure 1:
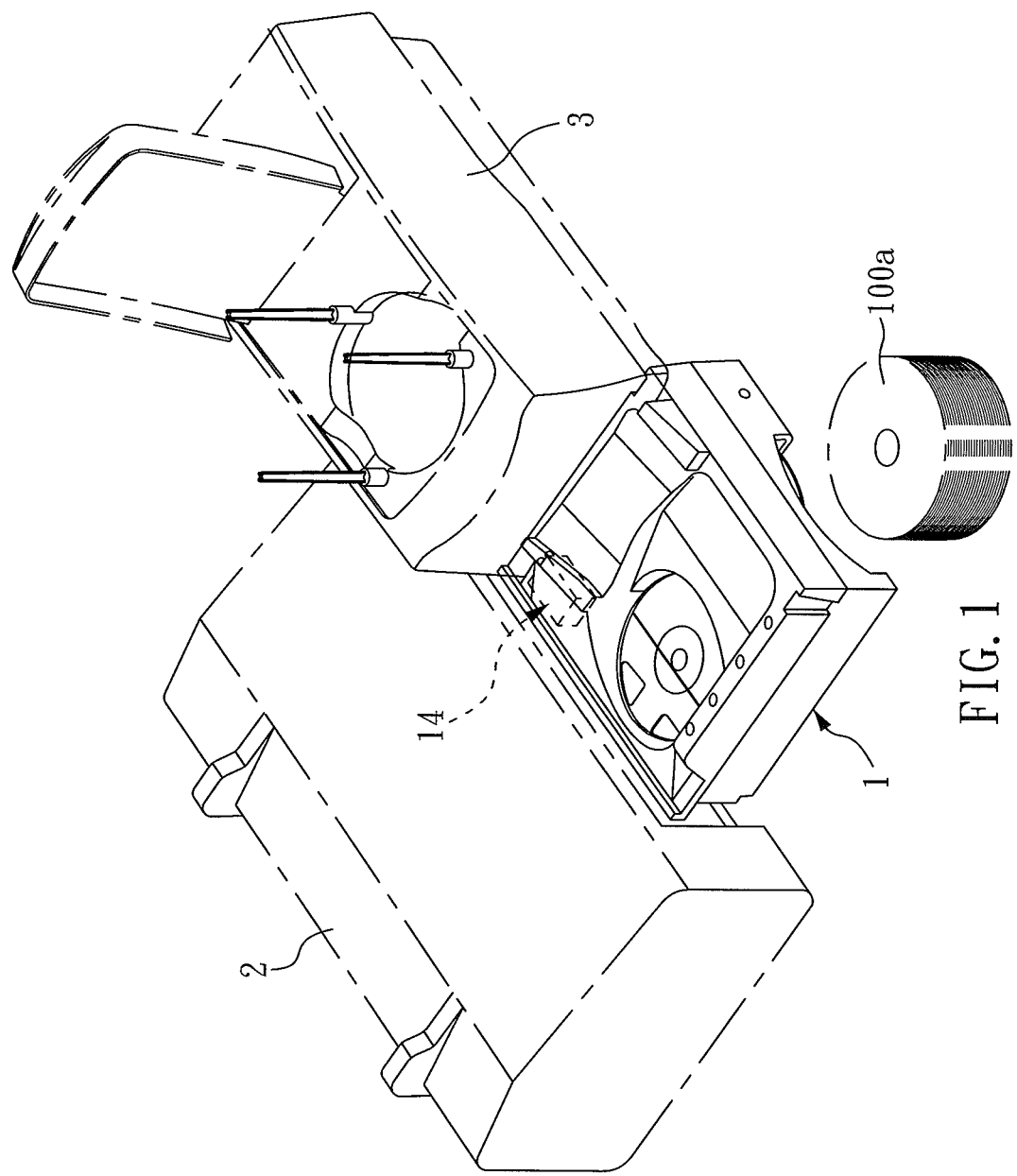
FIG. 1 shows a disc tray of the present invention to be adapted with a printing device and a processing device.

Please refer to FIG. 1. A disc tray 1 of the present invention can be adapted with a printing device 2 and a processing device 3. When a disc needs to be processed (such as recorded or verified) and printed, the disc will be sent to the processing device 3 for recording or verifying first. Then, the processed disc may be sent to the disc tray 1 automatically, through a transport arm (not shown), or manually for printing. Thus, the disc tray 1 of the present invention is adapted for the printing device 2 when using. The printing device 2 can be a general printer that can print for both papers and discs. After printing the processed disc, the disc tray 1 of the present invention can allow the printed disc to drop out automatically. So, it will be easy and efficient to collect all printed discs 100a.

Next refer to FIGS. 2A, 3A, 2B, 3B, 2C and 3C at same time. The disc tray 1 in accordance with the present invention comprises a mover driving means 11 (shown in FIGS. 3A and 3B), a main body 12, and a supporter 13. The mover driving means 11 comprises a first guiding portion 111. The main body 12 comprises a disc receiver 121, a second guiding portion 122, and a third guiding portion 123 engaged with a fourth guiding portion 131 of the supporter 13. The disc receiver 121 includes a holding portion 1211 and a portion 1212 connected with each other. The holder portion 1211 and the supporter 13 are separated with each other but can support a disc (not shown). The disc is printed or can be printed by the printing device 2 (as shown in FIG. 1).

The second guiding portion 122 is engaged with the first guiding portion 111. The mover driving means 11 drives the main body 12 by way of the first guiding portion 111 and the second guiding portion 122 to move the main body 12. In a preferred embodiment, the first guiding portion 111 is substantially a cam, and the second guiding portion 122 comprises a plurality of positioning holes for at least a part of the cam to engage with for rolling the main body 12 to move. In this embodiment, the mover driving means 11 may further comprise at least a gear 112 engaged with a bolt 1131 and the first guiding portion 111, and a motor 113 connected with the bolt 1131. However, the example shown in the drawings is not used to limit the present invention. For, example, the first guiding portion and the second guiding portion can be designed as a track and a guider respectively or the like to achieve the substantial same engaging and guiding functions. In this embodiment, the mover driving means 11 is fixed and unmoved corresponding to the main body 12, so when the first guiding portion 111 is driven by the motor 113 to rotate, the second guiding portion 122 engaged with the first guiding portion 111 can be used to move the main body 12.

The fourth guiding portion 131 is engaged with the third guiding portion 123 to allow the fourth guiding portion 131 to move along the third guiding portion 123. Furthermore, in one embodiment, the third guiding portion 123 extends along an edge of the disc receiver 121. In another embodiment, the third guiding portion 123 is a slot near the disc receiver 121. The fourth guiding 131 is substantially a bulge engaged with the third guiding portion 123 for allowing the supporter 13 to be moved along the third guiding portion 123. However, as described in above, the drawings are not used to limit the present invention. For example, the third guiding portion and the fourth guiding portion can be designed as holes and a cam respectively or the like to achieve the substantial same engaging and guiding functions.

In a preferred embodiment, the disc tray 1 further comprises a base 10 corresponding to the main body 12. When the main body 12 is moved forward to send an unprinted disc 100 received on the disc receiver 121 to the printing device 2 (as shown in FIG. 1), the base 10 is fixed to not move (corresponding to the moving of the main body 12).

Figure 2A:
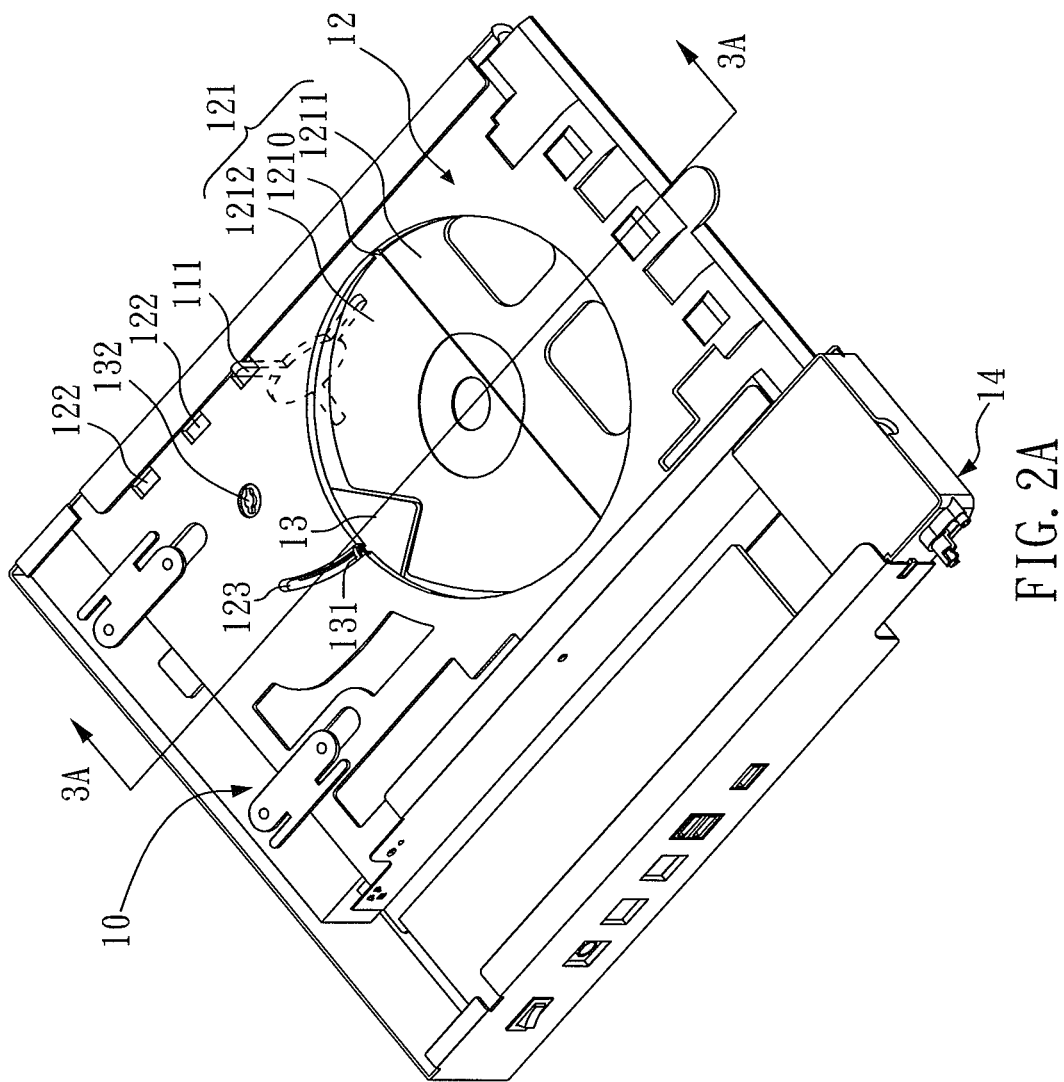
FIG. 2A shows an embodiment of a disc tray of the present invention when a supporter is stretched out of a main body to support a disc and ready for printing the disc.
Figure 2B:
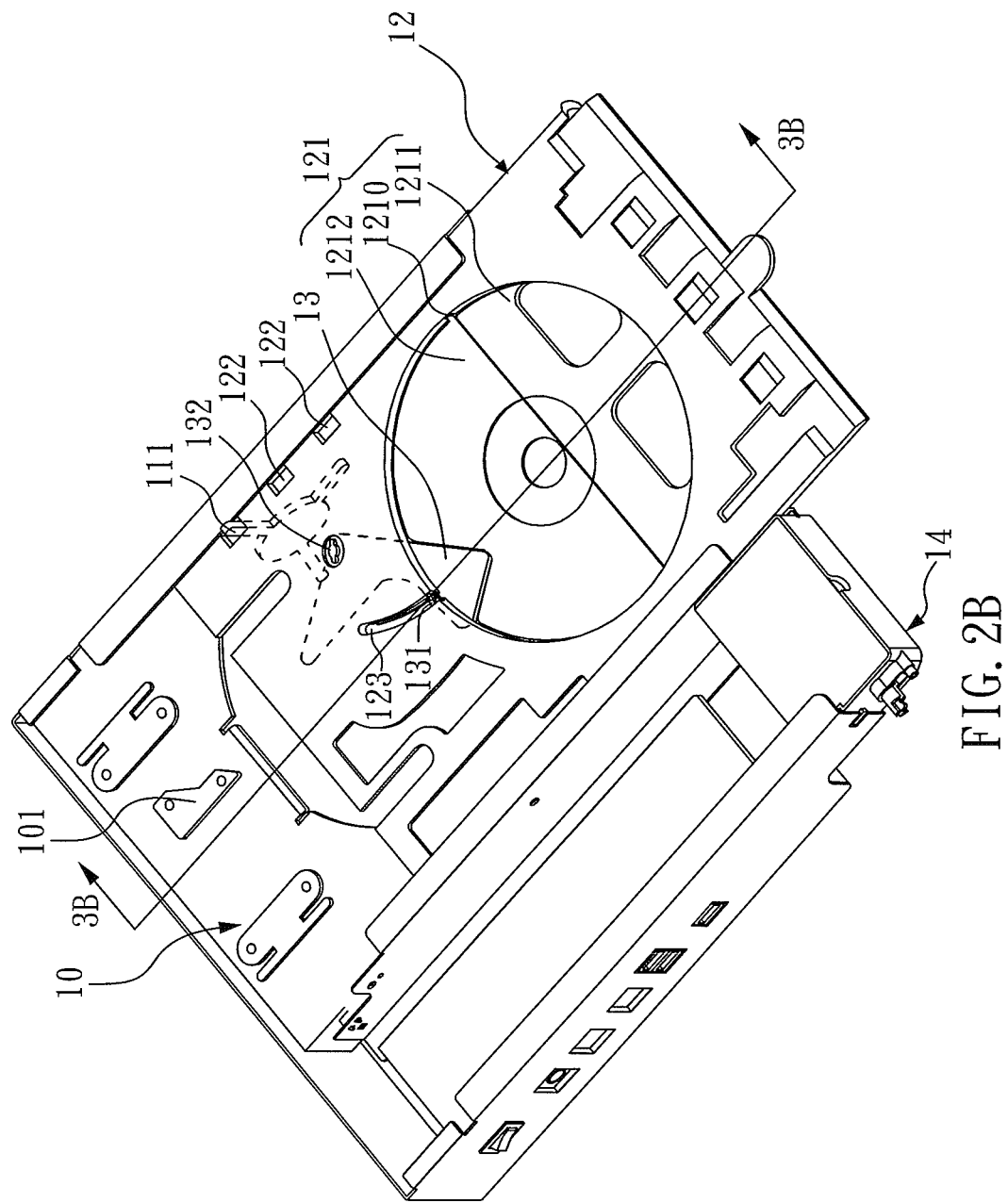
FIG. 2B shows an embodiment of a disc tray of the present invention when a main body is moved for printing a disc.

As shown in FIG. 3A, a disc 100 to be processed, such as processed by the processing device 3 (shown in FIG. 1), can be supported by the supporter 13 and the holding portion 1211. The mover driving means 11 drives the main body 12 by way of the first guiding portion 111 and the second guiding portion 122 to move the main body 12 forward. As shown in FIGS. 2B and 3B, the main body 12 moves forward along the arrow direction. At this moment, the printing device 2 (as shown in FIG. 1) prints on the disc 100. Then, the mover driving means 11 again drives the main body 12, but in the opposite direction to the original position.

Figure 3C:
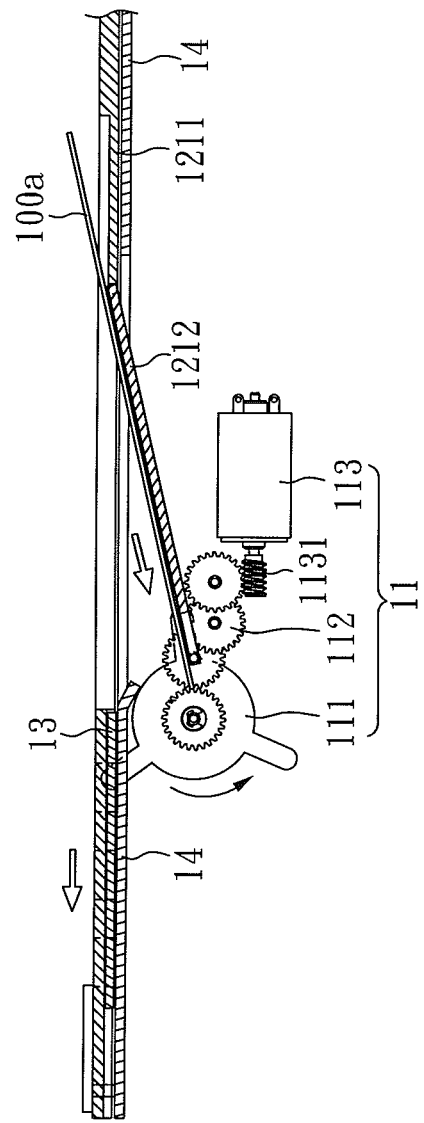
FIG. 3C shows a partial cross-section view according to the 3C-3C line in FIG. 2C.

As shown in FIG. 3C, when the disc receiver 121 receives the printed disc 100a, the supporter 13 is moved to be withdrawn and veiled under the main body 12 for dropping the printed disc 100a from the sloping portion 1212 of the disc receiver 121.

In a preferred embodiment, the sloping portion 1212 comprises an axle 1210 to allow the sloping portion 1212 to be moved up and down. As shown in FIG. 3B, when the main body 12 is moved forward (along the arrow direction) and since the base 10 is fixed to not move, the sloping portion 1212 can be lifted and supported by the base 10.

Figure 2C:
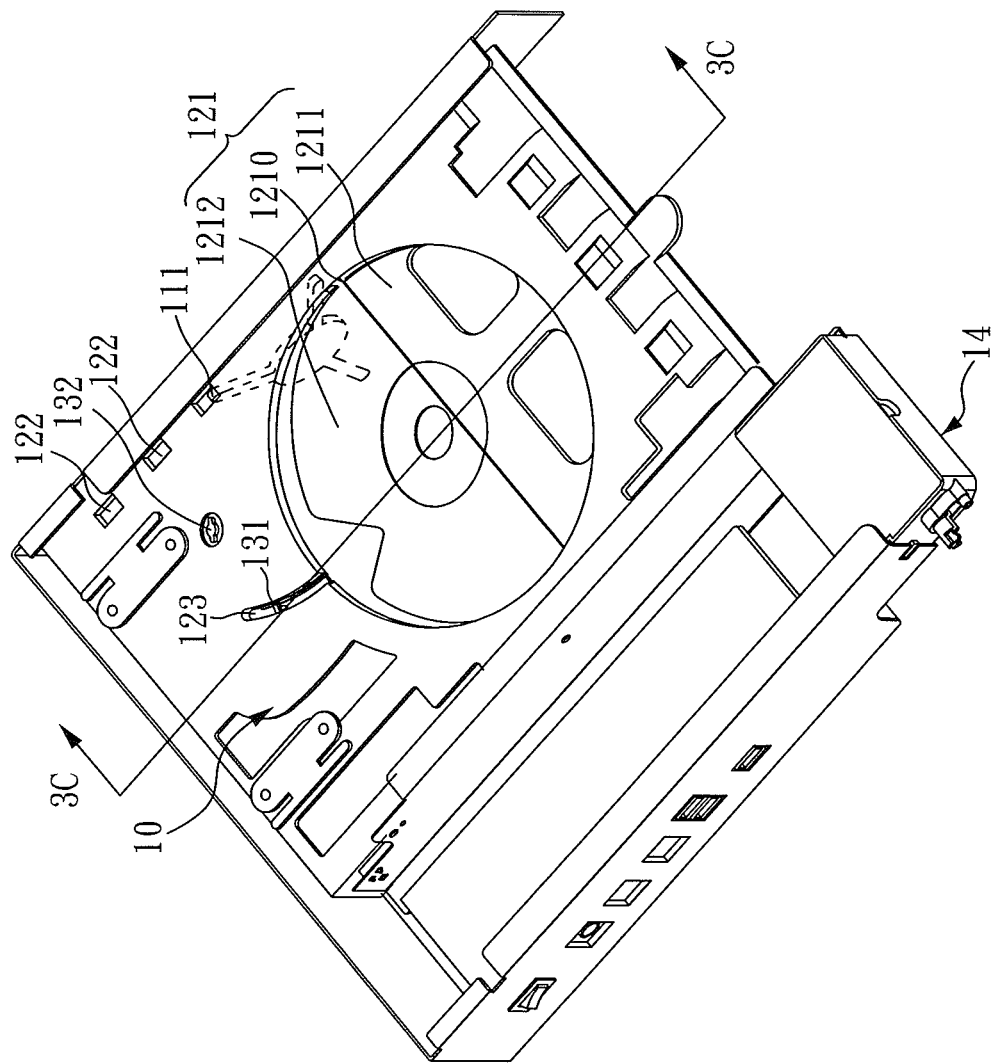
FIG. 2C shows an embodiment of a disc tray of the present invention when a supporter is withdrawn and veiled under a main body.

Please see FIG. 2A again. In a preferred embodiment, the supporter 13 may comprise a fix portion 132 to be connected with the main body 12 to allow the supporter 13 to be rotated around the fix portion 132. In this embodiment, as shown in FIG. 2B, the base 10 comprises a fifth guiding portion 101 fixed thereon for guiding the supporter 13. When the main body 12 is moved backward, as shown in FIG. 2C, the corresponding shapes of the supporter 13 and the fifth guiding portion 101 can allow the supporter 13 to be guided and moved to be veiled under the main body 12. In another word, the fifth guiding portion 101 is shaped corresponding to the supporter 13 to guide the supporter 13 to move under the main body 12 when the main body 12 is moved backward.

Figure 4A:
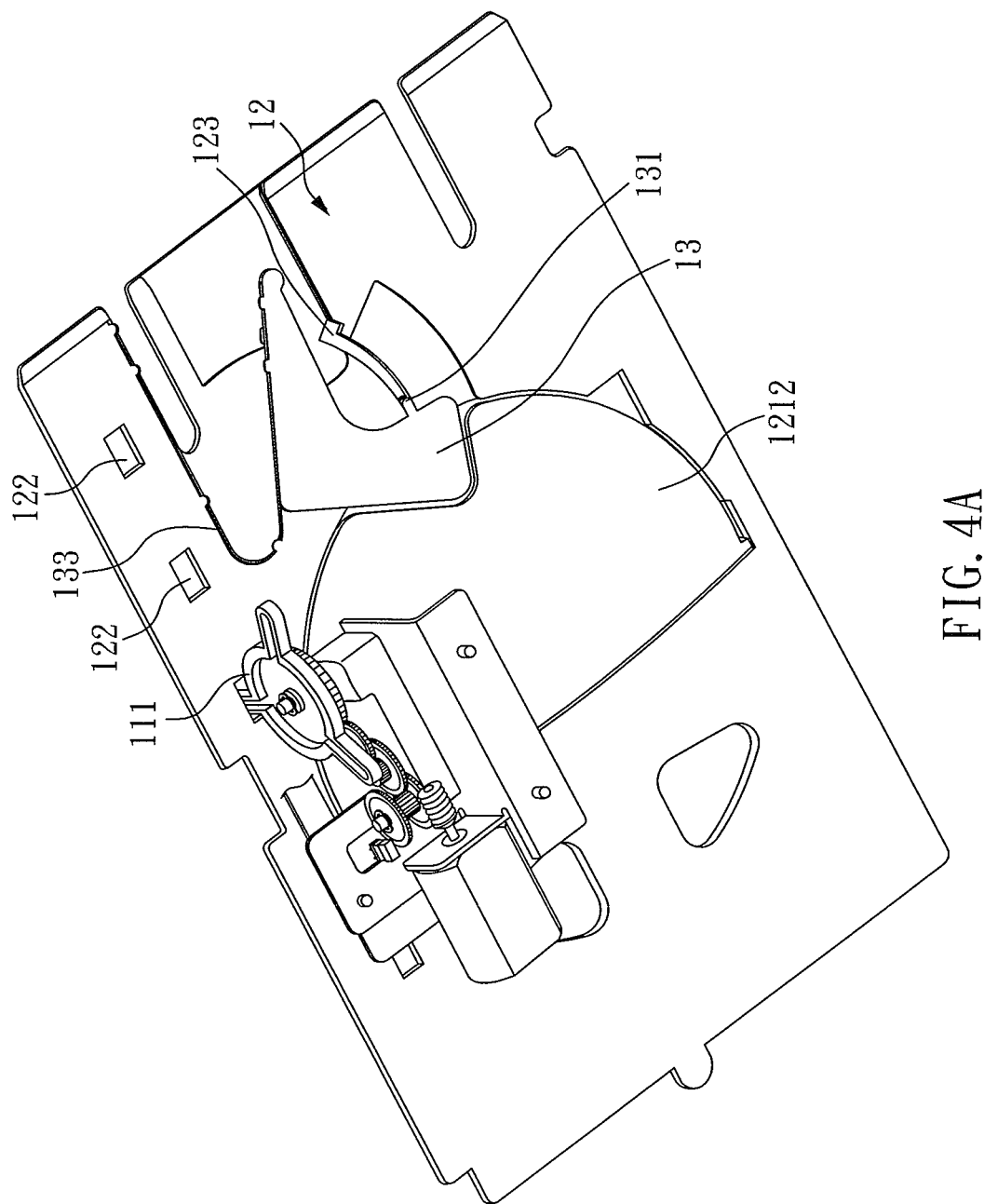
FIG. 4A shows partial elements in another angle of view from FIG. 2A.
Figure 4B:
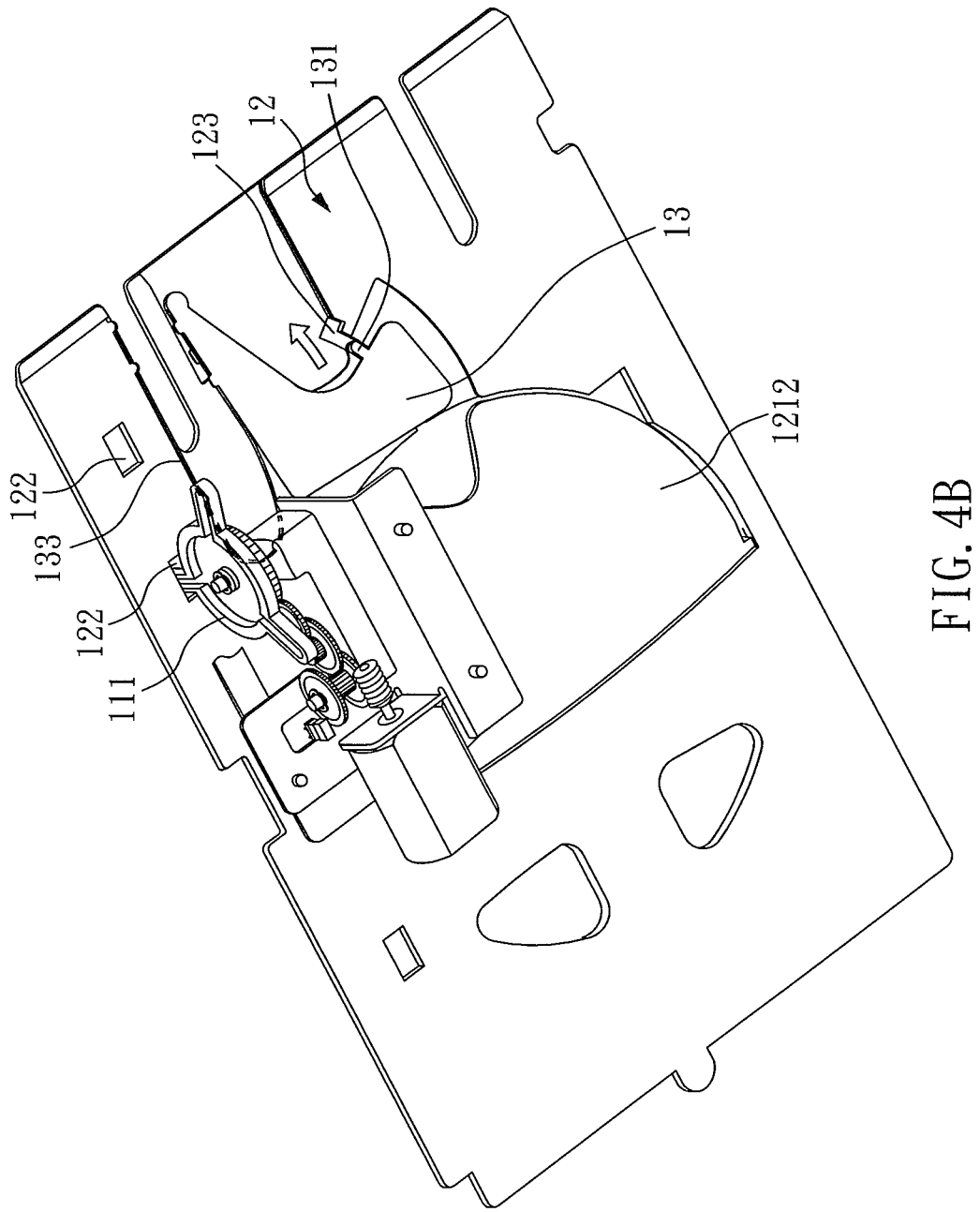
FIG. 4B shows partial elements in another angle of view from FIG. 2B.

Please see FIGS. 4A and 4B. In a preferred embodiment, the supporter 13 may comprise an elastic spring 133 connected thereon to provide elastic power for moving the supporter 13 in a different direction back to the original position of stretching out of the main body 12.

As described in the prior art, when a general printer is used for printing discs, manual change is required for the controlling of the printer. Thus, in a preferred embodiment, as shown in FIG. 1, the disc tray 1 further comprises a control box 14 for controlling a sensor (not shown) of the printing device 2 to allow the disc 100 to be printed automatically by the printing device 2.

Figure 5:
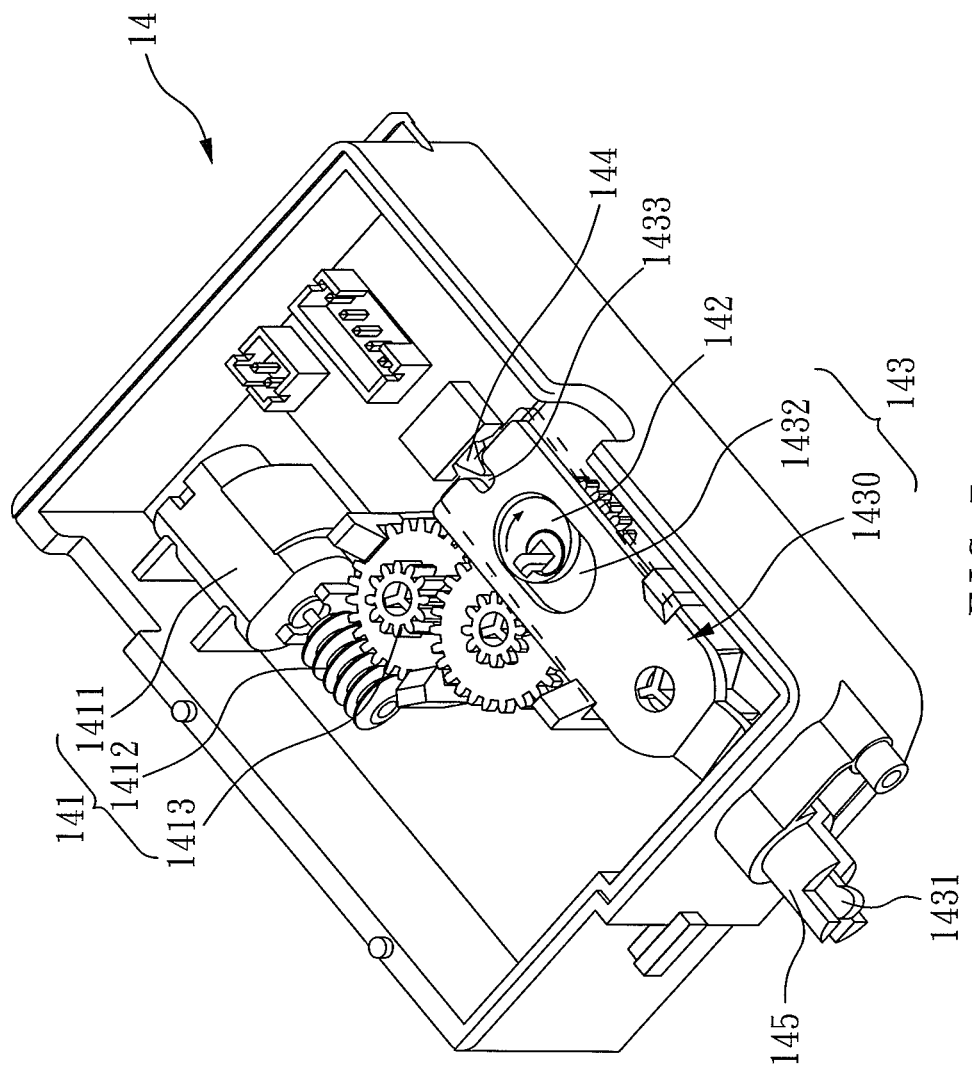
FIG. 5 shows an embodiment of a control box of the present invention.

Thus, in another aspect of the invention, a control box is provided. Please see FIG. 5. The control box 14 of the present invention is adapted to a disc tray (such as the disc tray 1 described above) for controlling a sensor (not shown) of a printing device. The control box 14 comprises a printer driving means 141, a hollowed shaft 145 with an indentation, a movable portion 143 comprising a main portion 1430 and a protrusion 1431 extending from the main portion 1430, and an eccentric cam 142 driven by the printer driving means 141. The main portion 1430 comprises a hole 1432 for receiving the eccentric cam 142.

The printer driving means 141 may comprise a motor 1411 and a bolt 1412 connected thereto to drive at least one gear 1413. The printer driving means 141 drives the eccentric cam 142 for swaying the main portion 1430 and the protrusion 1431 to unveil the protrusion 1431 from the hollowed shaft 145 for controlling the sensor of the printing device 2 (as shown in FIG. 1). Furthermore, when the sensor of the printing device 2 is a mechanic design, the control box 14 can sway the protrusion 1431 to control the sensor. In this embodiment, the main portion 1430 may comprise a bigger indentation 1433 for receiving a smaller fix part 144, so the main portion 1430 can sway between two sides of the bigger indentation 1433 and can stop by the smaller fix part 144. In addition, when the protrusion 1431 is veiled inside of the hollowed shaft 145, the hollowed shaft 145 can still be guided and connected with the printing device 2.

Although the present invention has been explained in relation to its preferred embodiments, it is to be understood that many other possible modifications and variations can be made without departing from the spirit and scope of the invention as hereinafter claimed.

What is claimed is:

1. A disc tray for a printing device comprising:
a mover driving means comprising a first guiding portion;
a main body comprising a disc receiver having a holding portion and a sloping portion connected with each other, a second guiding portion engaged with the first guiding portion, and a third guiding portion, wherein the mover driving means drives the main body by way of the first guiding portion and the second guiding portion to move the main body; and
a supporter comprising a fourth guiding portion moveably engaged with the third guiding portion with the fourth guiding portion moving along the third guiding portion, wherein the supporter and the holding portion are used to support a printed disc;

when the disc receiver receives the printed disc, the supporter is moved to be veiled under the main body for dropping the printed disc from the sloping portion of the disc receiver.

2. The disc tray as claimed in claim 1 further comprising a base corresponding to the main body, wherein when the main body is moved forward to send an unprinted disc received on the disc receiver to the printing device, the base is fixed not to move.

3. The disc tray as claimed in claim 2, wherein the base comprises a fifth guiding portion fixed thereon for guiding the supporter.

4. A disc tray for a printing device comprising:
a mover driving means comprising a first guiding portion;
a main body comprising a disc receiver having a holding portion and a sloping portion connected with each other, a second guiding portion engaged with the first guiding portion, and a third guiding portion, wherein the mover driving means drives the main body by way of the first guiding portion and the second guiding portion to move the main body;
a supporter comprising a fourth guiding portion engaged with the third guiding portion to allow the fourth guiding portion to move along the third guiding portion, wherein the supporter and the holding portion are used to support a printed disc fixed on the main body; and
a fifth guiding portion shaped corresponding to the supporter to guide the supporter moving under the main body when the main body is moved backward to a dropping disc position.

5. The disc tray as claimed in claim 2, wherein the supporter comprises an elastic spring connected thereon to provide elastic power for moving in a different direction.

6. The disc tray as claimed in claim 2, wherein the supporter comprises a fix portion to be connected with the main body to allow the supporter to be rotated around the fix portion.

7. The disc tray as claimed in claim 1, wherein the first guiding portion is substantially a cam.

8. The disc tray as claimed in claim 7, wherein the second guiding portion comprises a plurality of positioning holes for at least a part of the cam to engage with for moving the main body.

9. The disc tray as claimed in claim 1, wherein the third guiding portion extends along an edge of the disc receiver.

10. The disc tray as claimed in claim 9, wherein the fourth guiding is substantially a bulge engaged with the third guiding portion for allowing the supporter to be moved along the third guiding portion.

11. The disc tray as claimed in claim 1, wherein the third guiding portion is a slot near the disc receiver.

12. The disc tray as claimed in claim 11, wherein the fourth guiding is substantially a bulge engaged with the slot for allowing the supporter to be moved along the slot.

13. The disc tray as claimed in claim 11, wherein the sloping portion comprises an axle to allow the sloping portion to be moved up and down.

14. The disc tray as claimed in claim 1 further comprising a control box for controlling a sensor of the printing device to allow the processed disc to be printed automatically by the printing device, wherein the control box comprises:
a printer driving means;
a hollowed shaft with an indentation;
a movable portion comprising a main portion and a protrusion extending from the main portion, with the protrusion received inside the indentation, wherein the main portion comprises a hole; and
an eccentric cam driven by the printer driving means, wherein the hole of the main portion is used for receiving the eccentric cam;
wherein the printer driving means drives the eccentric cam for swaying the main portion and the protrusion to unveil the protrusion from the hollowed shaft.

15. A control box adapted to a disc tray for controlling a sensor of a printing device, with the disc tray used for the printing device, with the control box comprising:
a printer driving means;
a hollowed shaft with an indentation;
a movable portion comprising a main portion and a protrusion extending from the main portion, with the protrusion received inside the indentation, wherein the main portion comprises a hole; and
an eccentric cam driven by the printer driving means, wherein the hole of the main portion is used for receiving the eccentric cam;
wherein the printer driving means drives the eccentric cam for swaying the main portion and the protrusion to unveil the protrusion from the hollowed shaft for controlling the sensor of the printing device.

* * * * *